A. F. JEFFRIES.
RECEPTACLE CLOSURE.
APPLICATION FILED OCT. 13, 1916.
1,226,524.
Patented May 15, 1917.
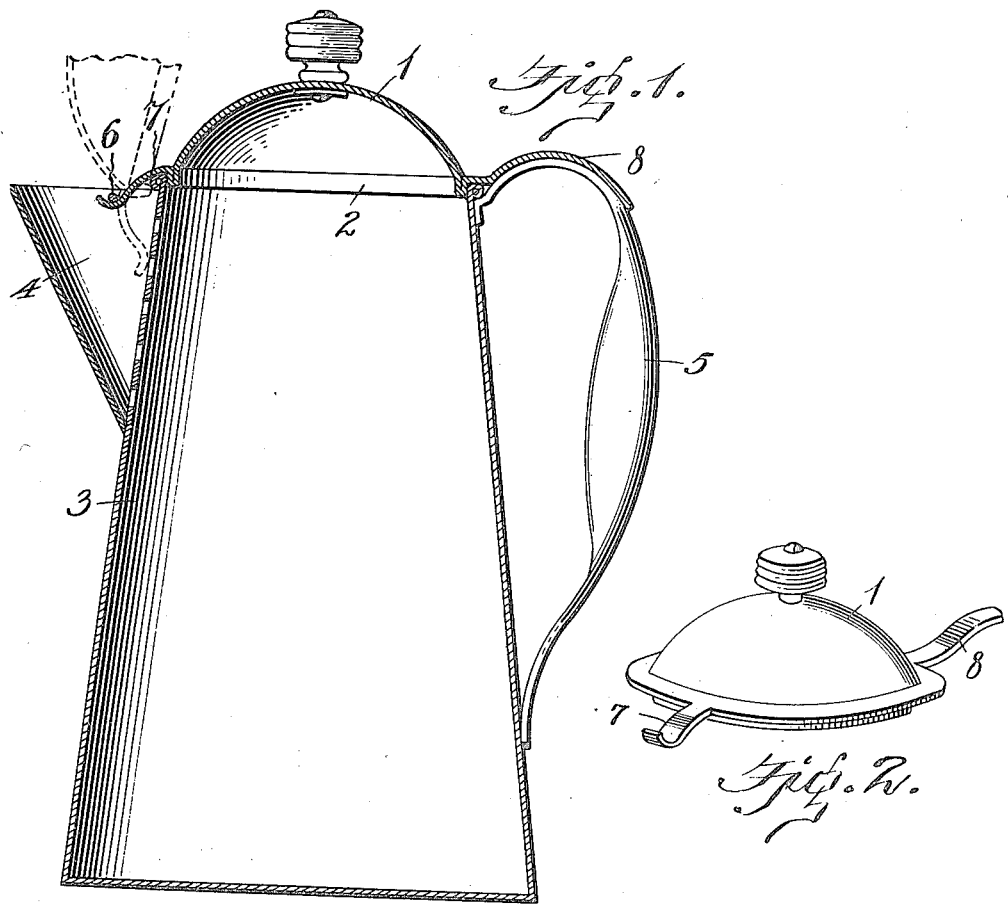
Witness
A. V. Pyle
Inventor
A. F. Jeffries
By Victor J. Evans
Attorney

UNITED STATES PATENT OFFICE.

ADOLPHUS F. JEFFRIES, OF NEW YORK, N. Y.

RECEPTACLE-CLOSURE.

1,226,524.  Specification of Letters Patent.  Patented May 15, 1917.

Application filed October 13, 1916. Serial No. 125,442.

*To all whom it may concern:*

Be it known that I, ADOLPHUS F. JEFFRIES, a citizen of the United States, residing at New York, in the county of New York and State of New York, have invented new and useful Improvements in Receptacle-Closures, of which the following is a specification.

This invention relates to receptacle closures generally and more particularly to closures for coffee pots.

An object of the invention is to provide a closure having means for facilitating its application to or removal from the pot as the occasion necessitates, the said means including a portion which is adapted to lie along the ordinary handle of the vessel in order that it may be grasped by the hand and the closure held against accidental displacement when the vessel is canted for the purpose of pouring or discharging its contents.

Another object of the invention is to provide as one element of the closure fastener an arm projecting forward and downward from the closure and adapted when the closure is in place over the mouth of the pot, to engage beneath a keeper bar carried by such pot; while it is also adapted, when the closure is raised, to engage behind the same keeper bar and maintain the closure in this position.

With the above and other objects in view which will appear as the nature of the invention is better understood, the same consists in the improved construction and novel arrangements of parts which will hereinafter be fully described and particularly pointed out in the claim.

In the drawings:—

Figure 1 is a vertical section through a coffee pot, showing the application of the cover thereto.

Fig. 2 is a perspective view of the cover.

With reference to the form of the invention shown, use is made of a cover 1, having a depending flange 2, adapted to fit within the upper end of the vessel 3. The vessel, aside from the cover is a coffee pot of substantially well known construction and is provided with a pouring spout 4, and a fixed handle 5. Extending across the spout at a slight distance from the front wall of the vessel and below its upper end is a keeper bar, here shown in the form of a short pin 6, which constitutes one element of the cover retaining means.

The cover is provided at its forward side with a rigidly projecting arm extending outward and downward for a short distance and having its tip bent upward into a substantially hooked shaped tongue 7, which is adapted to be associated with the pin 6. At a point diametrically opposite the tongue is a relatively long handle 8, which is adapted to come in close contact with and fit closely over the upper portion of the handle 5, whereby it may be inclosed by that hand of the operator which grasps said handle or held down by the thumb. In this manner, it is seen that when the vessel is canted for the purpose of pouring its contents into a cup or other receiver, the cover 1, will be positively held against accidental displacement. When it is desired to clean the vessel the cover 1, can be conveniently removed and cleaned individually as will be understood.

Attention is invited to the fact that depression of the handle 8 upon the fixed handle 5 of the vessel closes the cover onto the mouth of the same and prevents its rise at the rear, while the arm and its tongue engaging the cross bar prevent the rise of the cover at the front. Should it be desired to remove the closure of cover, it is only necessary to raise the handle 8 off the fixed handle to disengage the chine of the cover from the mouth of the vessel, and then draw the entire cover to the rear. Should it be desired to raise the cover temporarily, as for filling the vessel, the operator may raise the handle and cover to the position indicated in dotted lines in Fig. 1, when the arm drops behind the cross bar and its tip rests against the forward side of the vessel as shown, while the forward edge of the cover now rests upon the top of the spout.

What is claimed as new is:—

The combination with a coffee pot having a spout at one side of its open upper end and a handle at the other, and a pin extending transversely across the spout below the line of the upper end of the pot; of a cover, a handle extending rearward therefrom and overlying the handle of the pot when the cover is closed, and an arm extending forward and downward from the cover opposite its handle and having a tongue at its extremity adapted to engage beneath said pin when the cover is closed, the tongue resting against the front side of the pot and the arm behind the pin when the cover is raised, and the forward edge of the cover at this time rests upon the top of the spout.

In testimony whereof I affix my signature.

ADOLPHUS F. JEFFRIES.